(12) United States Patent
Girardeau et al.

(10) Patent No.: US 9,749,980 B2
(45) Date of Patent: Aug. 29, 2017

(54) SYSTEM AND METHOD FOR MANAGING COMMUNICATIONS OF AT LEAST ONE TERMINAL IN A COMMUNICATION NETWORK

(75) Inventors: Laurent Girardeau, Maule (FR); Marc Cartigny, Chatou (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 292 days.

(21) Appl. No.: 13/884,091

(22) PCT Filed: Nov. 4, 2011

(86) PCT No.: PCT/EP2011/069461
§ 371 (c)(1),
(2), (4) Date: Sep. 5, 2013

(87) PCT Pub. No.: WO2012/062667
PCT Pub. Date: May 18, 2012

(65) Prior Publication Data
US 2014/0018044 A1  Jan. 16, 2014

(30) Foreign Application Priority Data

Nov. 10, 2010  (FR) ..................................... 10 04392

(51) Int. Cl.
*H04W 60/00* (2009.01)
*H04W 8/26* (2009.01)

(52) U.S. Cl.
CPC ........... *H04W 60/005* (2013.01); *H04W 8/26* (2013.01)

(58) Field of Classification Search
CPC ... H04L 12/585; H04L 12/1859; H04L 12/56; H04L 12/12; H04L 12/06; H04W 8/26;
(Continued)

(56) References Cited

U.S. PATENT DOCUMENTS

| 2005/0050352 | A1  | 3/2005 | Narayanaswami et al. |
| 2006/0025140 | A1* | 2/2006 | Bales ............... H04W 4/24 455/445 |
| 2012/0047217 | A1* | 2/2012 | Hewes et al. ............... 709/206 |

FOREIGN PATENT DOCUMENTS

WO    WO 2007/085780    8/2007

OTHER PUBLICATIONS

Protocol for Hiding Movement of Mobile Nodes in Mobile IPv6 by Ying Qiu, Jianying Zhou, Feng Bao, Institute for Infocomm Research IEEE 2005.*

(Continued)

*Primary Examiner* — Nizar Sivji
(74) *Attorney, Agent, or Firm* — Nixon & Vanderhye, P.C.

(57) ABSTRACT

Each terminal wishing to access a communication service implemented in a communications network transmits an identifier of subscription to this service during a phase of registration (3.1; 3.2) with the network. With each service subscription identifier is associated a call identifier to enable calling the terminal registered via the network. A system (1.2, 1.3) intended to register at least one terminal (1.4) from amongst a plurality of terminals (1.3; 1.4) in a telephony network includes means for dynamically changing the service subscription identifier (3.11, 3.12, 3.13) and the associated call identifier (3.4, 3.5, 3.6), for at least one of said terminals, and means for re-registering (3.15) with said network each terminal for which the service subscription identifier and the associated call identifier have been dynamically changed.

10 Claims, 4 Drawing Sheets

(58) Field of Classification Search
CPC ....... H04W 8/22; H04W 60/005; H04W 4/24; H04W 84/16
USPC .......................................... 455/412.1, 435.1
See application file for complete search history.

(56) References Cited

OTHER PUBLICATIONS

International Preliminary Examination Report and Written Opinion issued in International Application No. PCT/EP2011/069461 dated May 14, 2013.
International Search Report for PCT/EP2011/069461, mailed Jan. 12, 2012.
French-language Written Opinion of the International Searching Authority for PCT/EP2011/069461, mailed Jan. 12, 2012.

* cited by examiner

Table 2.12

| i | Terminal identifier | Call identifier |
|---|---|---|
| 0 | 5.1 | 5.2 |
| 1 | | |
| ... | ... | ... |
| N-2 | | |

Table 1.6

| i | Terminal identifier | Call identifier | Subscription identifier |
|---|---|---|---|
| 0 | 5.3 | 5.4 | 5.5 |
| 1 | | | |
| ... | ... | ... | ... |
| N-1 | | | |

SYSTEM AND METHOD FOR MANAGING COMMUNICATIONS OF AT LEAST ONE TERMINAL IN A COMMUNICATION NETWORK

FIELD OF THE INVENTION

The present invention concerns the registration of at least one terminal from amongst a plurality of terminals in a network for the access to a communication service, such as a telephony service.

BACKGROUND ART

When a user wishes to access a communication service, a registration phase shall be implemented in order to check that the user has the appropriate subscription. During this registration phase, the terminal used by the user to attempt to access these services transmits a subscription identifier. This identifier is checked by a server of the communication services manager and, if the identifier is valid, the access to these services is validated.

According to a first example, such communication services are implemented in a telephony network in accordance with the GSM (Global System for Mobile communications) standard. According to the specification document "3*GPP TS 03.03: Numbering, Addressing and Identification*", a mobile terminal shall register with the network by transmitting the IMSI (International Mobile Subscriber Identity) identifier. The IMSI identifier is contained in the SIM (Subscriber Identity Module) card sent to each subscriber by the mobile telephony operator and serves to identify the subscriber when accessing the mobile telephony services.

According to a second example, such communication services are telephony services implemented over the Internet, by the use of VoIP (Voice over Internet Protocol) mechanisms. The user connects to a telephony service by communicating his subscription identifier and password and, once connected, it is possible to contact him by means of the IP (Internet Protocol) address allocated to the terminal that he is using.

According to a third example, such communication services are messaging services, of the e-mail type or of the instantaneous message type. In the same way, the user connects to the service by communicating his subscription identifier and password and, once connected, it is possible to contact him by means of the messaging address, such as an e-mail address, allocated to the subscription taken out.

An identifier for the subscription taken out with the communication services manager is therefore necessary to enable the user to access these services. However, this identifier also enables tracking the communications involving the user, or even determining his position in the coverage area of the network. The user can therefore easily be the subject of telephone tapping, and/or recordings of his data exchanges, and/or monitoring of his position and/or movements, unbeknownst to him.

BRIEF SUMMARY OF THE INVENTION

The invention concerns a device intended to register a terminal in a communications network, said device being adapted to enable the terminal to transmit, during a phase of registration of the terminal with said network, an identifier of subscription to a communication service implemented in said network. The device is such that it includes means for dynamically changing the identifier of subscription to said service in order to obtain a new subscription identifier, and means for re-registering with said network using the new subscription identifier. Thus, the risk that the communications involving the terminal be easily tracked is reduced.

According to a particular embodiment, the device also includes means for dynamically changing a call identifier associated with at least one other terminal registered in said network. Thus, when the subscription identifiers are dynamically changed for other terminals, the device can continue communicating with these terminals.

According to a particular embodiment, the device includes means for communicating with a server via said network, said communicating means being adapted to receive, from said server, information representing the new subscription identifier.

According to a particular embodiment, said information is the new subscription identifier. Thus, the terminal does not contain any information concerning any new subscription identifier until the server communicates such thereto. Security is thus reinforced in the case of theft of the terminal.

According to a particular embodiment, the device includes means for selecting the new subscription identifier from a plurality of subscription identifiers stored by said device. Thus, the subscription identifiers subject to dynamic change do not pass through the network, otherwise than in the normal context of the registration of the terminal with the network. Security is thus reinforced in the case of transmissions monitoring.

According to a particular embodiment, said information is an index in a table stored by said device and including, in an indexed fashion, said plurality of subscription identifiers. Thus, the server can make decisions on dynamic change according to data external to the terminal, and only information useless without the knowledge of the indexed table passes through the network.

According to a particular embodiment, said dynamic change means are implemented according to at least one of the following triggering events: a timer delay has elapsed; a predetermined instant is reached; a communication via said network with another terminal registered with said network has ended; said device is newly positioned in a predetermined geographical area; a synchronisation message is received.

According to a particular embodiment, the device consists of a SIM card for a mobile cellular telephony terminal.

The invention also concerns a method implemented by a device intended to register a terminal in a communications network, said device being adapted to enable the terminal to transmit, during a phase of registration of the terminal with said network, an identifier of subscription to a communication service implemented in said network. The method is such that it includes steps of dynamically changing the identifier of subscription to said service in order to obtain a new subscription identifier, and re-registering with said network with the new subscription identifier.

The invention also concerns storage means including a computer program including instructions for implementing the method mentioned above, when said program is executed by a computer system or a processor.

The invention also concerns a system for managing communications of at least one terminal from amongst a plurality of terminals in a communications network, each terminal being adapted to transmit, during a phase of registration with said network, an identifier of subscription to a communication service implemented in said network, with each subscription identifier being associated a call identifier to enable calling the terminal registered with said subscription identifier. The system is such that it includes means for dynamically changing an identifier of subscription to said service and an associated call identifier, for at least one of said terminals; and means for registering with said network each terminal for which the identifier of subscription to said service and the associated call identifier have been dynamically changed. Thus, it is possible to reduce the risk for the communications in a fleet of terminals to be tracked.

According to a particular embodiment, said dynamic change means are adapted to apply, in a substantially synchronised manner, a change of the identifier of subscription to said service of at least one first terminal in this first terminal and a change of each associated call identifier in at least one second terminal. Thus, it is possible to reduce the risk for the communications in the fleet of terminals to be tracked, while enabling the terminals to continue to be able to communicate with each other.

According to a particular embodiment, the dynamic change means are adapted so that, when a first terminal wishes to communicate with a second terminal, the first terminal implements means for requesting, from a terminal, the call identifier attributed to said first terminal.

According to a particular embodiment, the system includes a server adapted to transmit short messages to said terminals for using said dynamic change means, said messages being exchanged via a short message service centre masking said server for the devices of said network. Thus, the risk for the server to be located is reduced and the risk for the communications to be tracked is also reduced.

According to a particular embodiment, the system includes a voice messaging service including, implemented on call forwarding following an absence of response from one of said terminals, means for determining the call identifier of the called terminal; means for determining a fixed identifier of the called terminal, from the determined call identifier; means for recording a voice message for the attention of said originally called terminal and associating the recorded voice message with the determined fixed identifier. Thus, despite the dynamic change of subscription and call identifiers, it is possible to leave a voice message.

According to a particular embodiment, the voice messaging server also includes, implemented upon a call from one of said terminals, referred to as calling terminal: means for determining the call identifier of the calling terminal; means for determining a fixed identifier of the calling terminal, from the determined call identifier; means for recovering, from the determined fixed identifier, at least one voice message for the attention of said calling terminal and supplying said recovered voice message to said calling terminal. Thus, despite the dynamic change of subscription and call identifiers, it is possible to consult any voice messages waiting.

The invention also concerns a method for managing communications of at least one terminal from amongst a plurality of terminals in a communications network, each terminal being adapted to transmit, during a phase of registration with said network, an identifier of subscription to a communication service implemented in said network, with each subscription identifier being associated a call identifier to enable calling the terminal registered with said identifier of subscription to the service. The method is implemented by at least one device in said network, and is such that it includes steps of dynamically changing an identifier of subscription to said service and an associated call identifier, for at least one of said terminals; and of re-registering with said network each terminal for which the identifier of subscription to said service and the associated call identifier have been dynamically changed.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

So as to prevent all the communications involving a given user to be able to be tracked, it is proposed to dynamically change the subscription identifier of the user. Thus, it is difficult to track these communications since it is not known to whoever wishes to set up the telephone tapping, and/or the recording of data, and/or the position and/or movement monitoring, that the user will change subscription identifier.

According to a particular embodiment, it is sought to prevent the communications involving at least one terminal in a fleet of terminals, meaning a plurality of terminals, being able to be tracked. It is also sought that the terminals in the fleet can continue to communicate with each other, and in a transparent manner for the users of these terminals. When a subscription identifier is dynamically changed for a terminal, the corresponding call identifier in the other terminals in the fleet is then dynamically changed.

Figure 1:
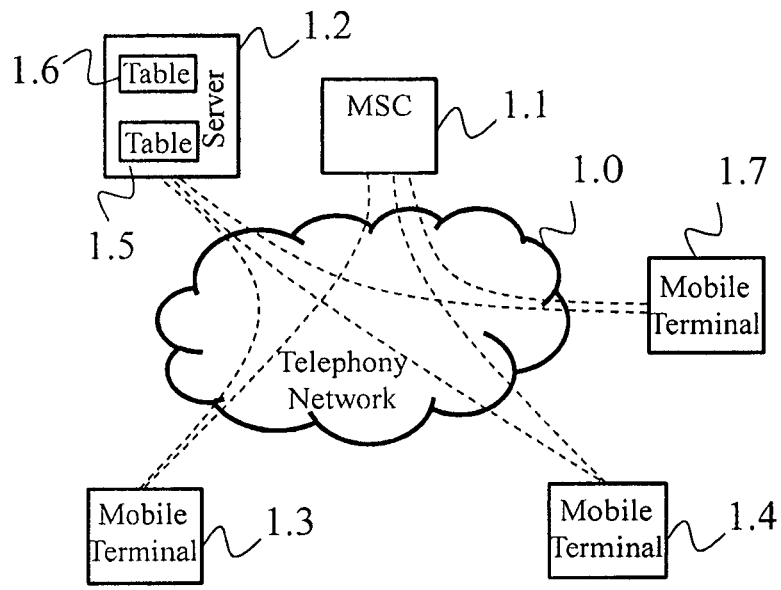
FIG. 1 schematically illustrates a telephony network in which the invention may be implemented.

FIG. 1 schematically illustrates a telephony network 1.0 in which the invention may be implemented.

The telephony network 1.0 is managed by at least one server 1.1 implementing telephony services. The telephony network 1.0 may be the Internet and the telephony services may be based on VoIP mechanisms.

It is considered in the remainder of the detailed description, by way of illustration, that the telephony network 1.0 is in accordance with the GSM standard. The server 1.1 is then equipment of the MSC (Mobile-services Switching Centre) type. The server 1.1 has access to databases of the HLR (Home Location Register) and VLR (Visitor Location Register) type in order to register a terminal with the network and to enable communications involving it to be established.

When a mobile terminal 1.3, 1.4 or 1.7 attempts to join the telephony network 1.0, it must register itself by transmitting its subscription identifier, meaning its IMSI identifier, to the server 1.1. This identifier is checked with the HLR database and, if it corresponds to a valid subscription, the server 1.1 enables the mobile terminal 1.3, 1.4 or 1.7 to setup communications with other terminals, via the telephony network 1.0 and the server 1.1.

In the remainder of the description, it is considered that the mobile terminals 1.3, 1.4 and 1.7 constitute the fleet of terminals. It is sought to prevent communications involving at least one of the mobile terminals 1.3, 1.4 and 1.7 being able to be tracked.

According to one embodiment of the invention, the telephony network 1.0 may include a server 1.2. As described hereinafter, the server 1.2 enables implementing the dynamic change of the IMSI identifiers of the mobile terminals 1.3 and 1.4. It includes an identification table 1.6 that includes identifiers of the mobile terminals 1.3, 1.4 and 1.7, as well as the IMSI identifiers and MS-ISDN (Mobile Station Integrated Services Digital Network Number) call identifiers that are associated with them at a given instant.

Figures 5A, 5B, 6:
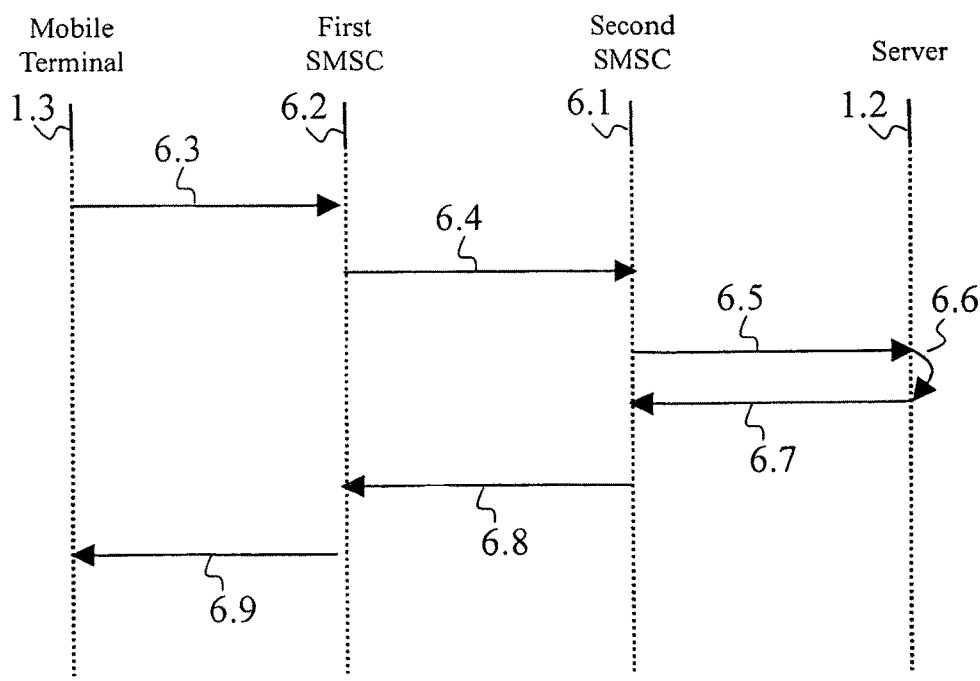
FIGS. 5*a* and 5*b* schematically illustrate identification tables implemented in the network of FIG. 1.

FIG. 5b schematically illustrates an example embodiment of the table 1.6. The elements of the table are referenced according to an index "i". The index i may take the integer values ranging from 0 to N−1, where N is the number of terminals in the fleet. Each terminal in the fleet is thus represented in the table 1.6. At an instant t, for each index value, the table 1.6 includes a terminal identifier 5.3, such as for example a name that is attributed thereto and known to all the devices in the fleet, the MS-ISDN call identifier that is attributed to this terminal at the instant t, and the IMSI subscription identifier that corresponds to this MS-ISDN call identifier.

The server 1.2 also includes a table 1.5 that contains IMSI and MS-ISDN identifiers available for performing the dynamic change of subscription of the mobile terminals 1.3, 1.4 and 1.7. Available IMSI and MS-ISDN identifiers means references, respectively subscription identifiers and associated call identifiers, to subscriptions taken out with a telephony operator and which allow accessing the telephony network 1.0. Thus, a set of subscriptions is provided to mobile terminals 1.3, 1.4 and 1.7. The management of the tables 1.5 and 1.6 is described hereafter in relation to FIG. 3.

Figure 2:
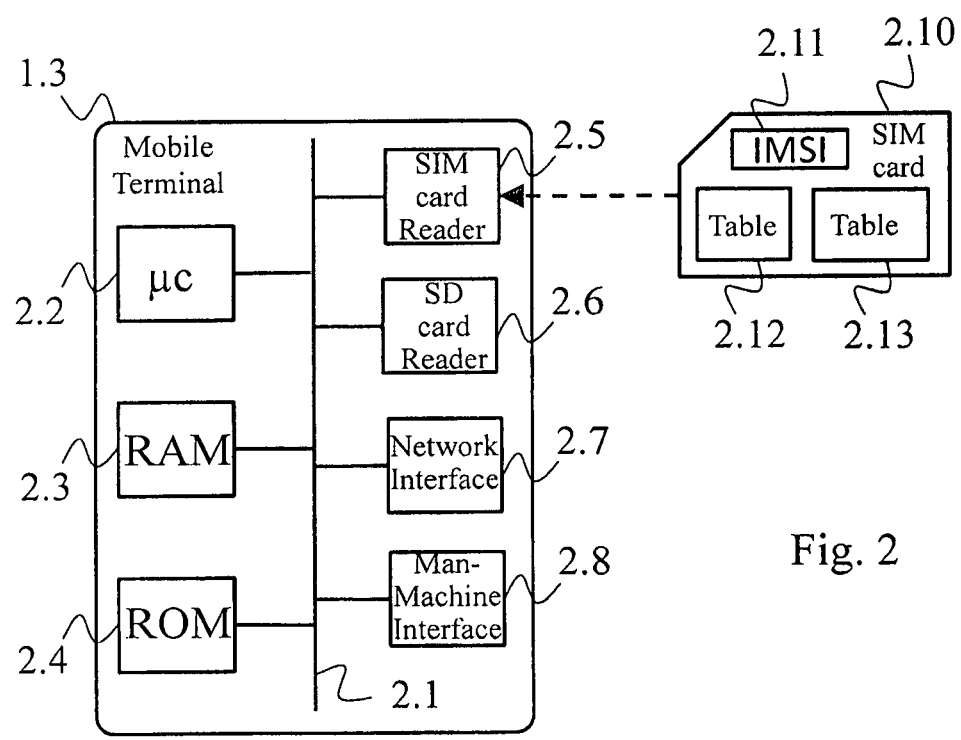
FIG. 2 schematically illustrates the architecture of a terminal adapted to be registered with the network of FIG. 1.

FIG. 2 schematically illustrates the architecture of the mobile terminal 1.3. The mobile terminals 1.4 and 1.7 have the same architecture.

The mobile terminal 1.3 includes, connected by a communication bus 2.1:
a processor, microprocessor, microcontroller (denoted µc) or CPU (Central Processing Unit) 2.2;
a RAM memory (Random Access Memory) 2.3;
a ROM memory (Read Only Memory) 2.4;
a SIM card reader 2.5;
a storage medium reader 2.6, such as an SD card (Secure Digital Card) reader;
means 2.7 for interfacing with the telephony network 1.0; and
man-machine interface means 2.8.

The microcontroller 2.2 is capable of executing instructions loaded into the RAM 2.3 from the ROM 2.4, a storage medium such as an SD card or the like, or a communications network. When the mobile terminal 1.3 is powered up, the microcontroller 2.2 is capable of reading instructions from the RAM 2.3 and executing them. These instructions form a computer program. This computer program causes the implementation, by the microcontroller 2.2, of all or some of the steps described hereafter in relation to FIGS. 3 and 4 to 6.

All or some of the algorithms described below in relation to FIGS. 3 and 4 to 6 may be implemented in software form or by execution of a set of instructions by a machine or a programmable circuit, such as a DSP (Digital Signal Processor) or a microcontroller, such as the microcontroller 2.2, or be implemented in hardware form by a dedicated machine or component, such as an FPGA (Field-Programmable Gate Array) or an ASIC (Application-Specific Integrated Circuit).

In a particular embodiment, the mobile terminal 1.3 is a cellular telephony network terminal, and all or some of the steps described hereafter in relation to FIGS. 3 and 4 to 6 are implemented by a SIM card 2.10 when it is inserted in the SIM card reader 2.5 of the mobile terminal 1.3.

The SIM card 2.10 includes a register 2.11 that includes the IMSI identifier used, or to be used, for registering the mobile terminal 1.3 with the telephony network 1.0. In other words, the register 2.11 includes the current IMSI identifier of the mobile terminal 1.3.

The SIM card 2.10 may also include an identification table 2.12 that contains an identifier of the mobile terminal 1.4 and the MS-ISDN call identifier that is attributed thereto, as well as an identifier of the mobile terminal 1.7 and the MS-ISDN call identifier that is attributed thereto. In other words, the identification table 2.12 is a directory containing contact names, this directory being dynamically modified with regard to the MS-ISDN call identifiers attributed to these contacts. The SIM card 2.10 may also include a table 2.13 that contains IMSI and MS-ISDN identifiers available for performing the dynamic change of subscription of the mobile terminals 1.3, 1.4 and 1.7. In a variant embodiment, the relationship between IMSI and MS-ISDN identifiers is not fixed, and the SIM card 2.10 includes two separate tables in replacement for the table 2.13: one of these tables contains the available IMSI identifiers, and the other the available MS-ISDN call identifiers. The management of the tables 2.12 and 2.13 is described hereafter in relation to FIGS. 3 and 4.

FIG. 5a schematically illustrates an example embodiment of the table 2.12. The elements of the table are referenced according to an index "i". The index i may take the integer values ranging from 0 to N−2, where N is the number of terminals in the fleet. Each terminal in the fleet is thus represented in table 1.6, with the exception of the mobile terminal 1.3, in which the table 2.12 is implemented. At an instant t, for each index value, the table 2.12 includes a terminal identifier 5.1, such as for example a name that is attributed thereto and known to all the devices in the fleet, and the MS-ISDN call identifier that is attributed to this terminal at the instant t. In a variant embodiment, table 2.12 includes N entries and repeats the elements 5.3 and 5.4 of the table 1.6, meaning the elements relating to the mobile terminal 1.3.

Figure 3:
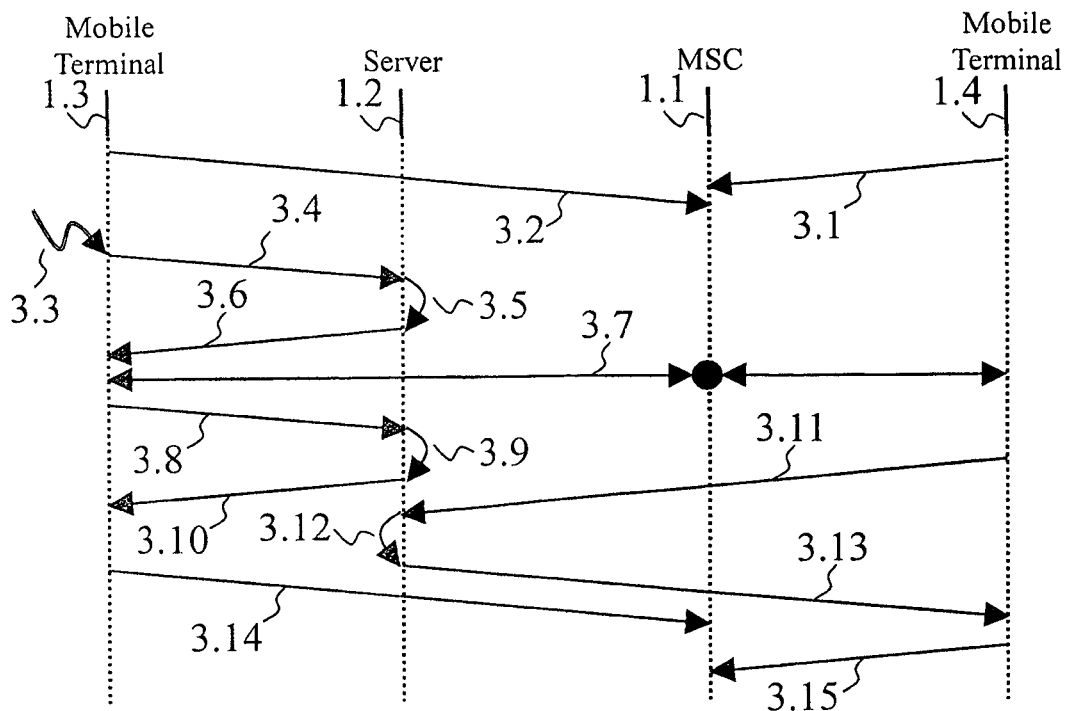
FIGS. 3, 4 and 6 schematically illustrate communications in the network of FIG. 1.

FIG. 3 schematically illustrates communications in the telephony network 1.0, in a first embodiment of the invention. Only the mobile terminals 1.3 and 1.4 of the fleet are considered so as to simplify the description.

During a step 3.1, the mobile terminal 1.3 registers itself with the telephony network 1.0 via the server 1.1. The mobile terminal 1.3 does the same during a step 3.2. An event 3.3 is then received by the mobile terminal 1.3, the event 3.3 indicating that a communication with the mobile terminal 1.4 is requested. During a following step 3.4, the mobile terminal 1.3 requests from the server 1.2 information necessary for communicating with the mobile terminal 1.4. During a following step 3.5, the server 1.2 determines this information and transmits it to the mobile terminal 1.3 during a step 3.6. This information may correspond to the MS-ISDN call identifier associated with the terminal 1.4, optionally in encrypted form. In a variant embodiment, the mobile terminal 1.3 includes the table 2.13, which repeats the elements 5.4 of the table 1.6. This information may then correspond to the index, in the table 2.13, of the MS-ISDN call identifier associated with the terminal 1.4.

During a following step 3.7, the mobile terminal 1.3 establishes a communication with the mobile terminal 1.4 via the server 1.1 by means of the information received from the server 1.2. When the communication between the mobile terminals 1.3 and 1.4 has ended, the mobile terminal 1.3 requests from the server 1.2 a change in the subscription that is attributed thereto. The mobile terminal 1.4 does the same in a step 3.11. During a step 3.9, the server 1.2 attributes a new subscription identifier to the mobile terminal 1.3 and, during a step 3.10, transmits thereto information representing the new IMSI identifier that is attributed thereto. During a step 3.12, the server 1.2 attributes a new subscription identifier to the mobile terminal 1.4 and, during a step 3.13, transmits thereto information representing the new IMSI identifier that is attributed thereto. This information may respectively correspond to the IMSI identifiers attributed, optionally in encrypted form. In a variant embodiment, each one of the mobile terminals 1.3 and 1.4 include the table 2.13, which repeats the elements 5.5 of the table 1.6. This information may then correspond respectively to the indices, in the table 2.13, of the attributed IMSI identifiers. The registers 2.11 of the mobile terminals 1.3 and 1.4 are then updated accordingly. During a step 3.14, the mobile terminal 1.3 disconnects from the telephony network 1.0 and re-registers with the telephony network 1.0 via the server 1.1, using the new identifier that has been attributed thereto. The mobile terminal 1.4 does the same during a step 3.15. The method can then be reiterated as from the step 3.4 upon receiving a new event 3.3.

In a variant embodiment, the server 1.2 sends to each terminal in the fleet a synchronisation message including the IMSI identifier newly allocated to the mobile terminal to which the message is addressed. The mobile terminals 1.3 and 1.4 then implement the steps 3.8 to 3.15 upon receiving this synchronisation message.

In a variant embodiment, the event 3.3 may also be the trigger for implementing the steps 3.8, 3.9, 3.10 and 3.14.

Figure 4:
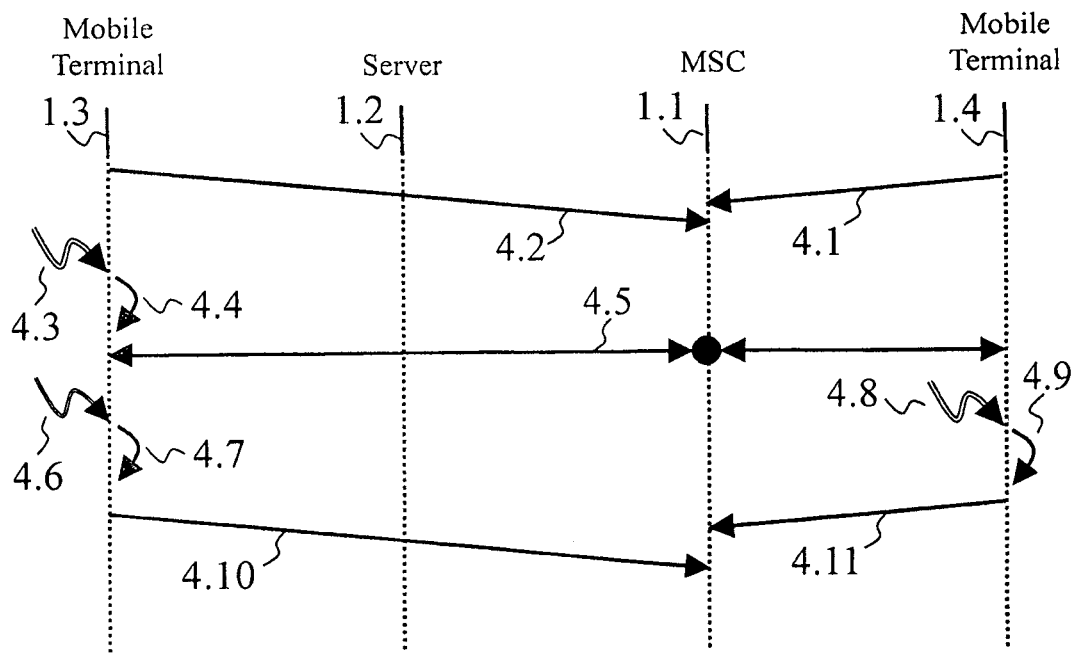

FIG. 4 schematically illustrates communications in the telephony network 1.0, in a second embodiment of the invention. Only the mobile terminals 1.3 and 1.4 in the fleet are considered in order to simplify the description.

During a step 4.1, the mobile terminal 1.4 registers itself with the telephony network 10 via the server 1.1. The mobile terminal 1.3 does the same during a step 4.2. An event 4.3 is then received by the mobile terminal 1.3, the event 4.3 indicating that a communication with the mobile terminal 1.4 is requested. During a following step 4.4, the mobile terminal 1.3 determines the MS-ISDN call identifier to be used for communicating with the mobile terminal 1.4. To do this, it runs through the table 2.12 and obtains this MS-ISDN call identifier 5.2 from the identifier 5.1 of the mobile terminal 1.4. During a following step 4.5, the mobile terminal 1.3 establishes a communication with the mobile terminal 1.4 via the server 1.1 by means of the MS-ISDN call identifier obtained during the step 4.4.

Then, once the communication has ended, the mobile terminals 1.3 and 1.4 receive, or generate, respective triggering events 4.6 and 4.8. When the triggering events are received by the mobile terminals, and not generated by them, a protocol may be implemented so as to ensure that each mobile terminal in the fleet has received the triggering event that is intended for it, for example using an acknowledgement mechanism. The mobile terminal 1.3 then updates, from the table 2.13, its IMSI identifier 2.11 and the table 2.12. The mobile terminal 1.3 thus replaces its telephone subscription identifier, and the MS-ISDN call identifier of the mobile terminal 1.4, with new values. The mobile terminal 1.4 does the same during a step 4.9. Each of the terminals in the fleet thus ends up with a new telephone subscription attribution. During a step 4.10, the mobile terminal 1.3 re-registers itself with the telephony network 1.0 via the server 1.1, using the new identifier that has been attributed thereto. This re-registration includes an initial phase of disconnection from the network. The mobile terminal 1.4 does the same during a step 4.11. The method can then be reiterated as from the step 4.4 upon receiving a new event 4.3.

The event 4.6, 4.8 triggering the dynamic change of IMSI identifiers of at least one mobile terminal in the fleet is that the communication, via the telephony network 1.0, between the mobile terminals 1.3 and 1.4 has ended. In variant embodiments, the triggering event 4.6, 4.8 may be that a timer delay has elapsed, that a predetermined instant is reached, that the concerned mobile terminal is newly positioned in a predetermined geographical area that the mobile terminal 1.3 can for example obtain by means of an internal GPS (Global Positioning System) module, or that a synchronisation message is received. Such a synchronisation message is for example transmitted by the server 1.2 or by another terminal in the fleet. In the case where the event 4.6, 4.8 triggering the dynamic change of IMSI identifier is that the concerned mobile terminal is newly positioned in a predetermined geographical area, the concerned mobile terminal sends a message to all the mobile terminals in the fleet so that each mobile terminal performs the corresponding update.

In order to dynamically change their respective IMSI identifiers, the mobile terminals 1.3 and 1.4 have the same table 2.13. Upon receiving the events 4.6 and 4.8, the mobile terminals 1.3 and 1.4 select their respective IMSI identifiers, by applying an orthogonal pseudo-random sequence. This enables dynamically changing the telephone subscription attributions to all the terminals in the fleet without collisions in these attributions. In the same way, each obtains the MS-ISDN call identifiers of the other terminals in the fleet.

According to a particular embodiment, the events 4.6 and 4.8 are received, or generated, in a substantially synchronised manner. Thus, it is possible to apply, in a substantially synchronised manner, a change to the telephone subscription identifier of at least one first terminal and a change to each associated call identifier in at least one second terminal. The change may not be perfectly synchronised on the terminals, for example because the messages transmitted by the server 1.2 may have different transit times, the internal clocks of the terminals may be offset with respect to one another, or when waiting until an on-going communication between two terminals has ended before applying the change.

FIG. 6 schematically illustrates communications in the telephony network 1.0 between the mobile terminal 1.3 or 1.4 and the server 1.2. These communications preferentially take the form of short messages. Preferably, these short messages are of the SMS type, and the communications from the server 1.2 to the mobile terminal 1.3 and 1.4 particularly take the form of short messages of the OTA SMS (Over-The-Air Short Message Service) type according to the specification document "3*GPP TS* 03.48*: Security Mechanisms for SIM Application Toolkit; Stage* 2". Thus, it is possible for the server 1.2 to be able to exchange information with the SIM card 2.10 so that these exchanges are transparent for the user, and for the microcontroller 2.2.

Preferably, the communications between the mobile terminal 1.3 or 1.4 and the server 1.2 are performed in encrypted form.

During a step 6.3, the mobile terminal 1.3 transmits a message, for example the request 3.4, to the server 1.2. The message is first of all received by a first short message service centre SMSC 6.2, typically the one of the operator of the telephony network 1.0. During a step 6.4, the message is transmitted to a second short message service centre SMSC 6.1. This second centre 6.2 is a trusted centre with regard to the fleet of mobile terminals, typically the one of the operator with which the subscriptions for the mobile terminals in the fleet have been taken out. The message is then transmitted to the server 1.2, during a step 6.5. During a step 6.6, the server 1.2 performs the appropriate processing according to the received message and generates in response a message to the mobile terminal 1.3. During a step 6.7, the message is transmitted to the mobile terminal 1.3. This message is first of all received by the second centre 6.2 and then transmitted in a step 6.8 to the first centre 6.1, which then transmits it to the mobile terminal 1.3 in a step 6.9. Thus the server 1.2 is masked by the first centre 6.1 from the point of view of the second centre 6.2 and the other devices in the telephony network 1.0, which further reduces the risks for the communications within the fleet to be tracked and for the server 1.2 to be located.

The server 1.2 may further use a short message of the SMS OTA type, also referred to as short message of class 2, to update the table 2.13 of the terminals in the fleet.

In addition, the server 1.2 and/or the first centre 6.1 may associate lifetime information with the messages transmitted from the server 1.2 to the terminals in the fleet. Thus, if a message is sent to a terminal for which a communication is on-going, the message will be delivered to the terminal after the end of the communication only if the message is not out of date. In this way, it is avoided that the terminal receives out of date information, such as an IMSI identifier that was attributed thereto but which, during the period of unavailability of the terminal, was attributed to another terminal.

Figure 7:
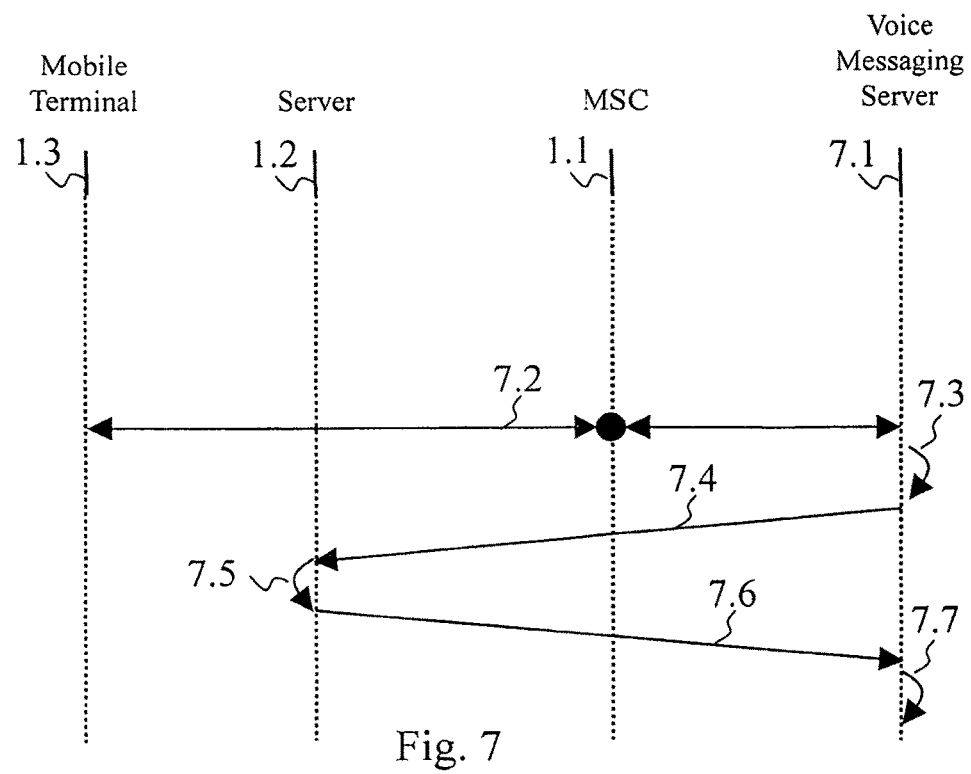
FIGS. 7 and 8 schematically illustrate communications in the network of FIG. 1 for accessing a voice messaging service.

FIG. 7 schematically illustrates first communications in the telephony network 1.0 for accessing a voice messaging service. In the context of FIG. 7, the mobile terminal 1.3 seeks to contact the mobile terminal 1.4. In the event of non-response from the mobile terminal 1.4, the call is forwarded to a voice messaging server 7.1. In a step 7.2, following the call forwarding, a communication is established between the mobile terminal 1.3 and the server 7.1. In a following step 7.3, the server 7.1 determines the MSD-ISDN call identifier of the terminal originally called, meaning the mobile terminal 1.4. In a following step 7.4, from this MS-ISDN call identifier, the server 7.1 requests from the server 1.2 the identifier 5.3 corresponding to the terminal originally called. It is reminded that the identifier 5.3 is a fixed identifier, known to all the devices in the fleet, whatever the dynamic changes in subscription identifier and call identifier performed. The server 1.2 determines the corresponding identifier 5.3 in a following step 7.5 and supplies this identifier 5.3 to the server 7.1, in a following step 7.6. In a following step 7.7, the server 7.1 recovers a voice messaging welcome message associated with the mobile terminal 1.4, from the identifier 5.3 supplied by the server 1.2, and the server 7.1 plays this welcome message in the context of its communication with the mobile terminal 1.3. The server 7.1 then records a voice message intended for the mobile terminal 1.4 and associates it with the identifier 5.3.

Thus, although the subscription and call identifiers of the mobile terminal 1.4 change dynamically, it is possible to leave a voice message for the attention of its user.

Figure 8:
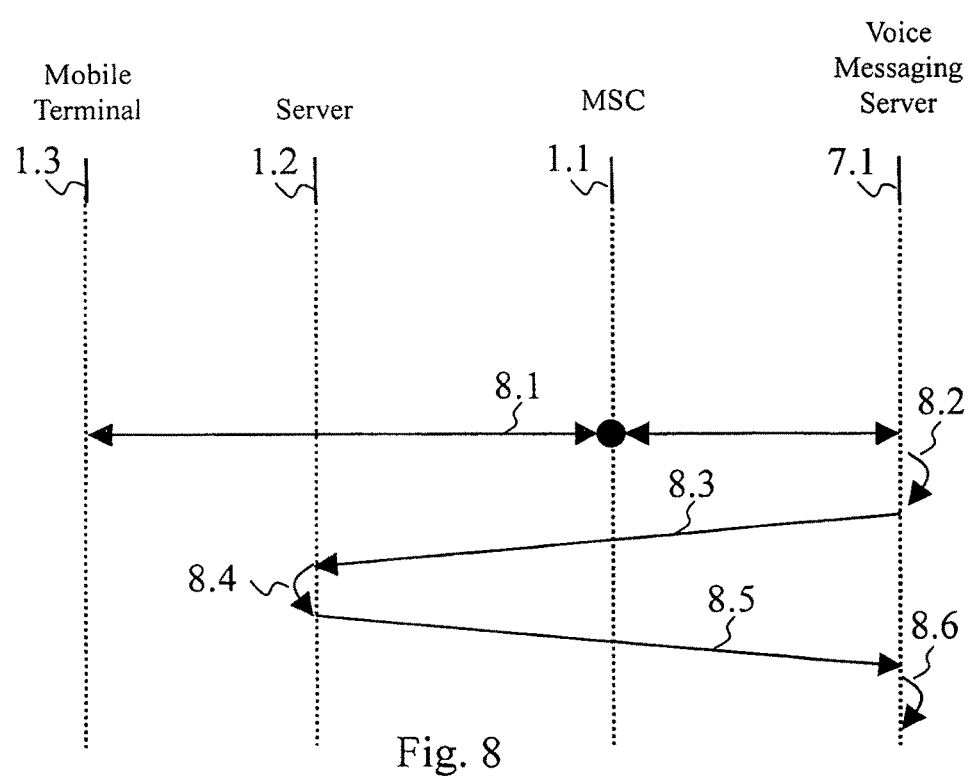

FIG. 8 schematically illustrates second communications in the telephony network 1.0 for accessing the voice messaging service. In the context of FIG. 8, the mobile terminal 1.3 calls the server 7.1 in order to consult any voice messages waiting. In a step 8.1, a communication is established between the mobile terminal 1.3 and the server 7.1. In a following step 8.2, the server 7.1 determines the MS-ISDN call identifier of the calling terminal, meaning the mobile terminal 1.3. In a following step 8.3, from this MS-ISDN call identifier, the server 7.1 requests from the server 1.2 the identifier 5.3 corresponding to the calling terminal. The server 1.2 determines the corresponding identifier 5.3 in a following step 8.4 and supplies this identifier 5.3 to the server 7.1, in a following step 8.5. In a following step 8.6, the server 7.1 recovers any voice messages waiting for the mobile terminal 1.3, from the identifier 5.3 supplied by the server 1.2, and the server 7.1 supplies any such voice messages in the context of its communication with the mobile terminal 1.3. Thus, although the subscription and call identifiers of the mobile terminal 1.3 change dynamically, it is possible to consult any voice messages for the attention of its user.

According to a particular embodiment, the call identifier of the server 7.1 may change dynamically. It then appears in the tables 1.6 and 2.12 in the same way as the terminals in the fleet. In this case, it is necessary to modify accordingly, with the manager of the communication service, the programming of the call forwarding numbers on non-response from the terminals in the fleet.

According to a particular embodiment, the mobile terminals in the fleet may also dynamically change their respective IMEI (International Mobile Equipment Identity) identifiers in order to further reduce the risks that the communications within the fleet be tracked.

The invention has been described in detail in the context of a telephony network of the GSM type. The invention can be implemented in any other mobile telephony network including a registration phase with subscription identifier transmission.

As already mentioned, the invention can be implemented in the context of a system in a telephony network for fixed and mobile terminals. The invention can in particular be implemented in the context of VoIP telephony services.

In the context of VoIP telephony services, implemented according to the session initiation protocol (SIP) described by the standard RFC 3261 of the IETF, the subscribers are identified from a uniform resource identifier (URI) associated with a password. By means of this identifier, the terminal registers with a software switch (softswitch) of the manager, or operator, of the telephony service, which allocates thereto a call number or call identifier. In the same way as previously described in the context of a GSM network, the subscription and call identifiers of the various terminals in a fleet can be changed, in a way that is controlled by the fleet, and transparently to the manager or operator of the telephony service.

In addition, it should be noted that the dynamic changes in subscription identifier and call identifier described previously also apply to the data sessions and the messaging services.

From the point of view of the cellular networks, the manager or operator of the communication service attributes an IP address to each terminal, when the latter registers with the network. Thus, like the MS-ISDN call identifier, the IP address is associated with the IMSI identifier. Therefore, dynamically changing the IMSI identifier enables dynamically changing the IP address and therefore make the terminal less locatable.

The invention claimed is:

1. A terminal for use in a communications network, said terminal being configured to transmit, during a phase of registering the terminal in said communications network, an identifier of subscription to a communication service implemented in said communications network, wherein said terminal implements in software form by execution of a set of instructions by a machine or a programmable circuit or implements in hardware form by a dedicated machine or component or implements by a Subscriber Identity Module SIM card inserted in the terminal via a SIM card reader of said terminal:

dynamically changing the identifier of subscription to said communication service by obtaining a new subscription identifier from a server via the communications network; and re-registering with said communications network with the new subscription identifier, wherein when said terminal uses the new subscription identifier to communicate with another terminal of the communications network, said terminal transmits a request, to the server via the communications network, for obtaining a call identifier attributed to said other terminal, said call identifier enabling calling said other terminal via the communications network, the other terminal being registered with said communications network with a respective identifier of subscription to the communication service, wherein said terminal is further configured to receive from the server, in response to said request, the call identifier attributed to said other terminal, and wherein said terminal is further configured to further communicate with said other terminal using the call identifier that is attributed to said other terminal and received from the server in response to said request.

2. The terminal according to claim 1, wherein the identifier of subscription to said communication service is dynamically changed according to at least one of the following triggering events:

a timer delay has elapsed;

a predetermined instant is reached;

a communication, via said communications network, with the other terminal or a third-party terminal registered in said communications network has ended; and said device is newly positioned in a predetermined geographical area.

3. The terminal according to any one of claims 1 or 2, wherein dynamically changing the identifier of subscription and re-registering with said communications network with the new subscription identifier are performed by a Subscriber Identity Module card for a mobile cellular telephony network.

4. A method implemented by a terminal in a communications network, the terminal transmitting, during a phase of registration of the terminal with said communications network, an identifier of subscription to a communication service implemented in said communications network, wherein the terminal performs:

dynamically changing the identifier of subscription to said communication service by obtaining a new subscription identifier from a server via the communications network; and re-registering with said communications network with the new subscription identifier, wherein, when said terminal uses the new subscription identifier to communicate with another terminal of the communications network, said terminal transmits a request, to the server via the communications network, for obtaining a call identifier attributed to said other terminal, said call identifier enabling calling said other terminal via the communications network, the other terminal being registered with said communications network with a respective identifier of subscription to the communication service, wherein said terminal receives from the server, in response to said request, the call identifier attributed to said other terminal, and wherein said terminal then communicates with said other terminal using the call identifier attributed to said other terminal and received from the server in response to said request.

5. A non-transitory information storage medium storing a computer program including instructions for implementing, by a device configured to register a terminal in a communications network, the method according to claim 4, when said computer program is executed by a processor of said device.

6. A system for managing communications of at least one terminal from amongst a plurality of terminals in a communications network, each terminal being configured to transmit, during a phase of registration with said communications network, an identifier of subscription to a communication service used in said communications network, a call identifier being associated with each subscription identifier to enable calling the terminal registered with said subscription identifier, wherein said terminals implement in software form by execution of a set of instructions by a machine or a programmable circuit or implement in hardware form by a dedicated machine or component or implement by a Subscriber Identity Module SIM card inserted in the terminal via a SIM card reader of said terminal:

dynamically changing the identifier of subscription to said communication service and the associated call identifier, for at least one of said terminals; and re-registering with said communications network each terminal for which the identifier of subscription to said communication service and the associated call identifier have been dynamically changed, wherein, when a first terminal of said plurality communicates with a second terminal of said plurality, the first terminal is configured for transmitting a request, to a server via the communications network, for obtaining the call identifier attributed to said second terminal, wherein said first terminal is configured to receive from the server, in response to said request, the call identifier attributed to said second terminal, and wherein said first terminal is configured to further communicate with said second terminal using the call identifier of said second terminal received from the server in response to said request.

7. The system according to claim 6, wherein said server is configured to transmit short messages to said terminals for dynamically changing their respective identifiers of subscription to said communication service and the respective associated call identifiers, said messages being exchanged via a short message service center masking said server for the devices in said communications network.

8. The system according to any one of claim 6 or 7, wherein it includes a voice messaging server configured for, on call forwarding following an absence of response from one of said terminals, referred to as terminal originally called:

determining the call identifier of the originally called terminal;

determining a fixed identifier of the originally called terminal, from the determined call identifier; and recording a voice message for the attention of said originally called terminal and associating the recorded voice message with the determined fixed identifier.

9. The system according to claim 8, wherein the voice messaging server is further configured for, upon a call from one of said terminals, referred to as calling terminal:

determining the call identifier of the calling terminal;

determining a fixed identifier of the calling terminal, from the determined call identifier; and recovering, from the determined fixed identifier, at least one voice message for the attention of said calling terminal and supplying said recovered voice message to said calling terminal.

10. A method for managing communications of at least one terminal from amongst a plurality of terminals in a communications network, each terminal transmitting, during a phase of registration with said communications network, an identifier of subscription to a communication service implemented in said communications network, a call identifier being associated with each subscription identifier to enable calling the terminal registered with said identifier of subscription to said communication service, said method being implemented by a system in said communications network, said method including:

dynamically changing the identifier of subscription to said communication service and the associated call identifier, for at least one of said terminals; and re-registering in said communications network of each terminal for which the identifier of subscription to said communication service and the associated call identifier have been dynamically changed, wherein, when a first terminal communicates with a second terminal of the communications network, the first terminal transmits a request, to a server via the communications network, for obtaining the call identifier attributed to said second terminal, wherein said first terminal receives from the server, in response to said request, the call identifier attributed to said second terminal, and wherein said first terminal communicates with said second terminal using the call identifier of said second terminal received from the server in response to said request.

* * * * *